Dec. 19, 1961   C. P. CASTEEL   3,013,348
DEVICE FOR EDUCATING A CHILD
Filed May 19, 1960
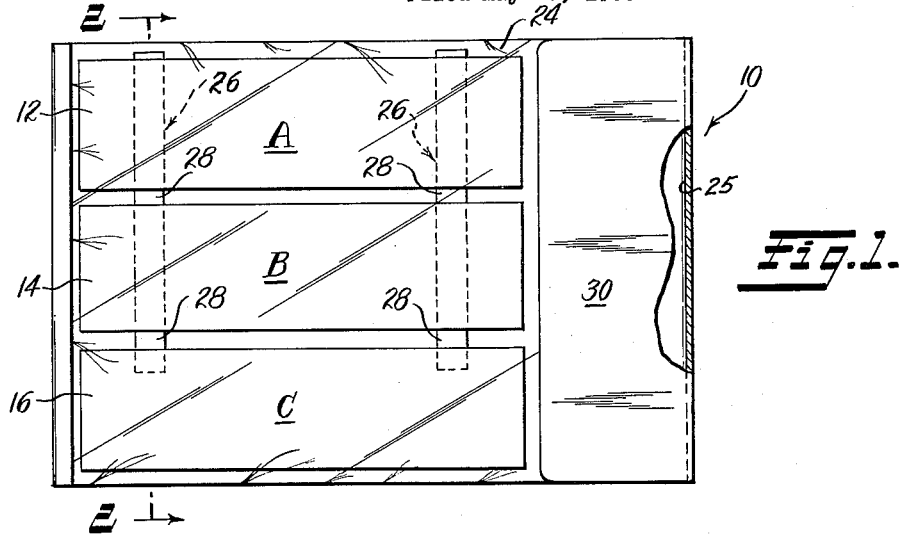
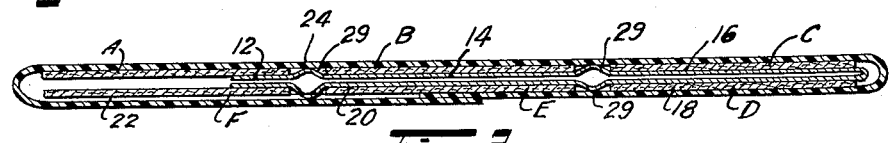
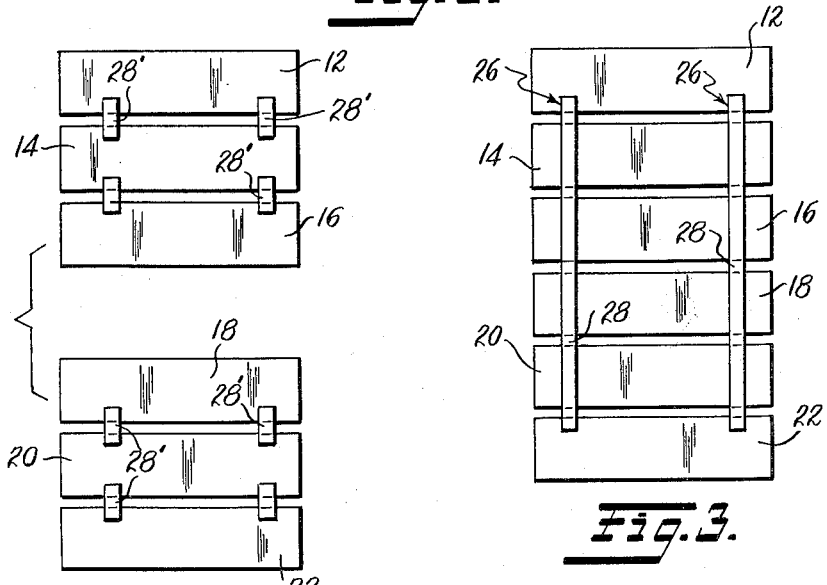
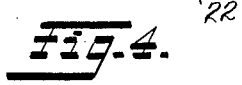
INVENTOR.
Charles P. Casteel
BY
ATTORNEY

United States Patent Office 3,013,348
Patented Dec. 19, 1961

3,013,348
DEVICE FOR EDUCATING A CHILD
Charles P. Casteel, 719 Grand Ave.,
Glenwood Springs, Colo.
Filed May 19, 1960, Ser. No. 30,273
6 Claims. (Cl. 35—69)

This invention relates to the education of children and more particularly to a device for stimulating the imagination of a child to enable the child to perform the activities of a given or selected group of adults.

More specifically, this invention relates to a device for educating children by stimulating the imagination of the children in a manner which enables them to simulate, imitate, mimic, act out or in other ways perform the activities of a selected group of adults.

It is believed to be well known and established that children greatly enjoy the opportunity to imitate, mimic, simulate or in other ways act out and perform the activities of adults and in other ways conduct themselves in a grown up manner.

Also, it is believed to be desirable to educate children in regard to the duties, responsibilities, obligations, rights, etc., which are generally necessary in the performance of various activities such as vocations and avocations of adult life.

Accordingly, it is the principal object of this invention to provide a device which stimulates the imagination of children and enables the children to imitate, simulate, mimic, or in other ways perform the activities of adults and enable the children to conduct themselves in a grown up manner.

An additional object of this invention is to provide an educational device for children which includes a plurality of members each of which designates a distinct element of an adult activity.

A further additional object of this invention is to provide an educational device for children which includes a plurality of separable and independent card-like members each of which has indicia means thereon for designating or representing a different, distinct or definite element, such as stations, locations, characteristics, aspects, entities, features, persons, or the like, of a given or selected adult activity.

Another object of this invention is to provide an educational device which enables youngsters to be exposed to the activities, duties, responsibilities and obligations which are incurred by adults while being active in certain selected adult activities.

Still another object of this invention is to provide an educational device which enables a child to gain experience relating to the activities of adults in various professional fields.

A further object of this invention is to provide an educational device which enables a group of children to gain experience and knowledge relating to the rights, duties, responsibilities and obligations of adult life in certain vocations and avocations.

It is also an object of this invention to provide, as an article of commerce, an educational device for children, packaged for commercial distribution, having consumer appeal, with each package containing a plurality of separable and individual members each having a distinctly different indicia means thereon with each member representing an element of a selected given adult activity with the group of members defining sufficient elements of the selected adult activity to enable the children to conduct themselves in a grown up manner and perform the adult activity which the children have selected.

It is also a further object of this invention to provide, as an article of commerce, an educational device for children, of the type disclosed, described, and claimed herein, packaged for commercial distribution, with each package containing a plurality of separable and individual members each having indicia means thereon representing an element of a selected given adult activity, with positioning means for disposing and maintaining each of the members in a position which enables a purchaser to easily ascertain the particular elements of the adult activity which are in the package.

Other objects, advantages and important features of the invention will be apparent from a study of the specification following, taken with the drawing, which together describe, disclose and illustrate certain embodiments of the invention and what is now considered and believed to be the best mode of practicing the principles thereof. Still other embodiments may be suggested to those having the benefit of the teachings herein, and such other embodiments are intended to be reserved especially as they fall within the scope and breadth of the subjoined claims.

In the drawing:

FIGURE 1 illustrates an educational device in accordance with this invention packaged for commercial distribution;

FIGURE 2 is a sectional view of the packaged educational device taken along the lines 2—2 of FIG. 1 looking in the direction of the arrows;

FIGURE 3 is a rear view of the educational device, removed from the package, ready for use in accordance with the teachings of this invention, illustrating one form of positioning means for disposing the educational device in the package, and FIGURE 4 is a view similar to FIG. 3 illustrating a modification of the positioning means.

Attention is now directed to the drawing wherein there is illustrated in FIGS. 1 and 2 a packaged educational device 10 which includes a plurality of separable independent card-like members 12, 14, 16, 18, 20 and 22. Each of the members 12—22 is provided with indicia means A, B, C, D, E and F respectively which may designate, identify or represent different, distinct or definite elements such as stations, locations, characteristics, aspects, entities, features, persons or the like, of a given or selected adult activity.

The members 12—22 are grouped so that the indicia means A—F will define the various features of the selected desired adult activity in such detail to enable children to conduct themselves in a grown up manner and perform the various aspects of life which are incidental and necessary in the practice of the adult activity which has been selected by the children. As illustrated, only one group of the members 12—22 has been packaged in a container 24 which enables the educational device 10 to be commercially distributed in commerce. It is to be understood that more than one group of the members 12—22 may be packaged in a single container 24 with each group of the elements 12—22 representing different adult activities without departing from the scope of the inventive concept as described, disclosed and claimed in the instant application.

By providing the separable and independent card-like members 12—22 with the respective indicia means A—F so that the card-like members designate, identify or indicate different, distinct or definite elements of a selected adult activity, vocation or avocation it is possible to place the respective members 12—22 on the children or at various locations which are easily accessible to the children, depending on the type of element which is identified by the card-like member, so that the children may vividly, easily and actually conduct, imitate, mimic or in other ways perform the obligations, responsibilities, duties and rights which are necessary in the performance of the selected adult activity and in this manner gain personal knowledge thereof.

As illustrated in FIGS. 3 and 4, the members 12—22 may be easily removed from the container 24 through an opening 25 therein and readily placed on the children or at various positions in order to represent the elements or features which are in some manner related to the conduct of the selected adult activity.

For example, medicine may be the adult activity which is desired to be stimulated in the imagination of the child and in this example, the members 12—22 may be designated to indicate or represent, by the respective indicia means A—F, patient, doctor, nurse, emergency room, surgery room, hospital room, laboratory or the like.

Also, should it be desired to select law as the adult activity and to so stimulate the imagination of the children it is then possible that the indicia means A—F may designate, identify or represent judge, jury, witnesses, plaintiff, defendant, counsel, or the like in accordance with the required or necessary elements of the selected activity which is desired to be stimulated in the child's mind.

Other adult activities which may be desired to be stimulated in the minds of children may include astronauts; space travel; military service such as Army, Navy, Air Force, Marines; business establishments such as restaurants, clothing stores, drug stores, department stores, or the like; governmental agencies such as police, fire stations, etc.; domestic activities such as home, travel, etc.; as well as many other activities which are carried on through the normal conduct of an adult's life.

It is also to be understood that any number of card-like members 12—22 may be used so that a corresponding number of elements may be represented or indicated by the indicia means A—F provided that the number of elements so represented or indicated will suffice to enable the children to conduct themselves in a grown up manner in performing the selected adult activity.

In order that a purchaser may select the proper educational device 10 which represents the desired adult activity, the container 24 is preferably formed from a transparent material and positioning means 26 is provided which disposes each of the card-like members 12—22 in back to back relationship, by pairs, with the respective indicia means A—F thereon facing outwardly so that the purchaser may easily ascertain the various elements which are represented, indicated or designated by the card-like members 12—22 when packaged in the container 24.

In the packaged container 24, as illustrated in FIGS. 1-3, the positioning means 26 takes the form of a pair of elongated gummed tape means 28 having gummed surface areas 29 thereon which are disposed substantially parallel and which extend continuously between all of the card-like members 12—22. However, it is to be understood that the positioning means 26 may be in the form of a plurality of tape portions 28', as illustrated in FIG. 4, with each of the tape portions 28' being of such extent so that only adjacent edge portions of the card-like members 12—22 are joined together by each of the tape portions 28'. In this manner, the card-like members 12—22 may be packaged in the transparent container 24 so that the card-like members 12—22 are disposed by pairs, in back to back relationship, with the respective indicia means A—F facing outwardly. The gummed tape means 28 and 28' are of the masking tape type which permits the card-like members 12—22 to be easily removed therefrom when the package is opened for use. Also, each of the containers 24 may be provided with a label 30 to identify the various adult activities that may be defined by the group or groups of members 12—22 which are packaged therein.

In both environments, as illustrated, it is to be noted that the adjacent edge portions of the card-like members 12—22, when secured to the positioning means 26, are spaced from each other so that the part of the gummed surface areas 29 of the tape means 28 and 28' which extends therebetween may also be removably secured to the inner surface of the container 24 and thereby further facilitate in the positioning of the card-like members 12—22 in the desired visible position therein.

While the invention has been described and disclosed in terms of certain embodiments which it has assumed in practice, the scope of the invention should not be deemed to be limited by the precise embodiment herein shown, illustrated, described and disclosed and it is to be understood that other such embodiments are intended to be reserved, especially as they fall within the scope of the claims herein subjoined.

I claim as my invention:

1. An educational device for children including a transparent container, a group of separable and independent members each having indicia means thereon for designating a distinct element of an adult activity, positioning means removably disposing said members in spaced relationship relative to each other within the transparent container with the indicia means facing generally outwardly, said positioning means having a part extending into the space between adjacent ones of the members, and means for removably securing the part of the positioning means to the inner surface of the transparent container.

2. The educational device as set forth in claim 1 wherein there is provided more than one group of said members.

3. The educational device as set forth in claim 1 wherein there is provided a plurality of groups of said members, each of said groups representing a different adult activity.

4. An educational device for children including a transparent container, a group of members each having indicia means thereon for designating a distinct element of an adult activity, positioning means for removably disposing said members in said transparent container in spaced apart pairs with each member of each pair being in back to back relationship relative to each other with the respective indicia means thereon facing generally outwardly to enable each of the indicia means to be easily identified, said positioning means extending between adjacent members of each pair, and means for removably securing the positioning means through the space between the adjacent members of each pair to the inner surface of the transparent container.

5. The educational device as set forth in claim 4 wherein said positioning means comprises a plurality of tapes removably connecting the adjacent members together.

6. The educational device as set forth in claim 5 wherein said means for removably securing the positioning means to the inner surface of the transparent container comprises a gummed surface area on each of the tapes.

References Cited in the file of this patent

UNITED STATES PATENTS

| 1,185,538 | Rand | May 30, 1916 |
| 1,678,621 | Holmes | July 24, 1928 |
| 1,755,853 | Waring | Apr. 22, 1930 |
| 1,812,077 | Belash | June 30, 1931 |
| 2,042,672 | McLean | June 2, 1936 |
| 2,080,734 | Mull | May 18, 1937 |
| 2,629,186 | Biddlestone | Feb. 24, 1953 |
| 2,690,253 | Francois | Sept. 28, 1954 |
| 2,757,791 | Kendig | Aug. 7, 1956 |